(12) United States Patent
Butler

(10) Patent No.: US 6,922,308 B1
(45) Date of Patent: Jul. 26, 2005

(54) DISK DRIVE COMPRISING A COVER SHAPED TO IMPROVE RADIAL AND AXIAL SHROUDING

(75) Inventor: Walter W. Butler, Felton, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/676,405

(22) Filed: Sep. 29, 2000

(51) Int. Cl.$^7$ .............................................. G11B 17/02
(52) U.S. Cl. ................................ 360/97.02; 360/97.03
(58) Field of Search ......................... 360/97.02, 97.01, 360/97.03, 258.1, 256.1; 369/258

(56) References Cited

U.S. PATENT DOCUMENTS

| | | | |
|---|---|---|---|
| 3,700,855 A | * 10/1972 | Helms et al. ................ 219/388 |
| 4,581,668 A | * 4/1986 | Campbell .................... 360/133 |
| 4,583,213 A | * 4/1986 | Bracken et al. ............. 369/261 |
| 5,124,856 A | * 6/1992 | Brown et al. ............. 360/97.02 |
| 5,282,100 A | 1/1994 | Tacklind et al. .......... 360/97.02 |
| 5,329,412 A | * 7/1994 | Stefansky ................ 360/97.01 |
| 5,526,203 A | * 6/1996 | Mohajerani et al. ..... 360/97.02 |
| 5,541,791 A | * 7/1996 | Yamasaki et al. ........ 360/256.1 |
| 5,631,787 A | * 5/1997 | Huang et al. ............ 360/97.02 |
| 5,696,649 A | * 12/1997 | Boutaghou ............... 360/97.02 |
| 5,781,373 A | 7/1998 | Larson et al. ............ 360/97.02 |
| 5,790,344 A | * 8/1998 | Allen ....................... 360/97.02 |
| 5,877,915 A | 3/1999 | Ishida ...................... 360/97.03 |
| 5,898,545 A | 4/1999 | Schirle .................... 360/254.7 |
| 6,091,570 A | * 7/2000 | Hendriks ................. 360/97.03 |
| 6,229,304 B1 | * 5/2001 | Guzik ......................... 324/212 |
| 6,351,344 B1 | * 2/2002 | Krum et al. ............. 360/97.01 |
| 6,697,213 B2 | * 2/2004 | Lofstrom et al. ........ 360/97.01 |
| 6,714,379 B1 | * 3/2004 | Thompson et al. ...... 360/97.02 |
| 6,721,128 B1 | * 4/2004 | Koizumi et al. ......... 360/97.02 |

FOREIGN PATENT DOCUMENTS

| JP | 59-218682 | * 12/1984 |
|---|---|---|
| JP | 2000-040340 | * 2/2000 |

* cited by examiner

Primary Examiner—Angel A. Castro
(74) Attorney, Agent, or Firm—Howard H. Sheerin, Esq.

(57) ABSTRACT

A disk drive with improved shrouding is disclosed. The disk drive comprises a disk, a spindle motor for rotating the disk, a head, an actuator arm for actuating the head radially over the disk, a base, and a cover attached to the base to form a head disk assembly chamber. The cover comprises an inner surface and an outer surface, and a shroud extending axially from the inner surface into the head disk assembly chamber substantially enveloping the periphery of the disk, including at least part of the periphery coextensive with the actuator arm, to provide radial shrouding of the disk.

6 Claims, 4 Drawing Sheets

DISK DRIVE COMPRISING A COVER SHAPED TO IMPROVE RADIAL AND AXIAL SHROUDING

BACKGROUND OF THE INVENTION

1. Field of the Invention

The present invention relates to disk drives for computer systems. More particularly, the present invention relates to a disk drive with improved shrouding.

2. Description of the Prior Art

A computer system usually includes one or more disk drives for economical, non-volatile data storage. FIG. 1 shows a typical prior art disk drive 100 which includes a housing formed by fitting a cover comprising an inner layer 102 and an outer layer 104 to a base 106 to create a sealed head disk assembly (HDA) chamber. The HDA includes one or more disks 108 stacked in a spaced-apart relationship on a spindle motor hub and rotated by a spindle motor (not shown). The disks 108 rotate in close proximity to a head 114 that is disposed by means of a head gimbal assembly (HGA) attached to one of a plurality of actuator arms 110.

The spindle motor includes a stationary element such as a fixed spindle shaft 116 affixed to the disk drive housing at the base and cover to define and stabilize a spindle axis about which a hub rotates the disks 108. A stator of the spindle motor, as well as bearings and seals, are secured between the fixed spindle shaft 116 and the rotating hub. The actuator arms 110 are part of a head stack assembly (HSA) that turns about a pivot bearing assembly by a voice coil motor (VCM) 112. The pivot bearing assembly includes a stationary element such as a pivot shaft that is fixed to the disk drive housing at the base and cover to define and stabilize a pivot axis for the HSA. Typically, the pivot shaft is rigidly coupled at the top to the cover and at the bottom to the base. The rigid attachment of the fixed spindle shaft and the pivot shaft fixes and stabilizes the relationship of the spindle axis and the pivot axis to control head positioning error. The actuator arms 110 move in response to energizing currents sent to the voice coil motor (VCM) 112 which moves the HSA on the pivot axis, swinging the actuator 110 arms to move the associated heads 114 over the associated disk surfaces.

It is desirable to transfer data to and from disks 108 rapidly. The data transfer rate increases with spindle motor rotational speed. However, there are a number of problems associated with higher spindle motor rotational speeds. One problem is increased internal air turbulence in the HDA which can excite disk flutter modes, thereby setting up resonances that can cause the heads 114 to move off track during read and write operations. Proper centerline tracking is imperative for faithfully writing data to, and reading data from the disks 108. Another problem associated with higher spindle motor rotational speeds is increased windage drag on the disks, thereby causing an increase in spindle motor current and elevated internal HDA temperature. Yet another problem associated with higher spindle motor rotational speeds is an increase in the acoustic noise radiated by the disk drive.

Shrouding the disks 108 can reduce internal air turbulence thereby attenuating disk flutter, windage drag, and acoustic noise. The prior art disk drive of FIG. 1 provides radial shrouding by molding the base 106 into a cylindrical form such that the disk 108 fits snugly within, leaving a very narrow gap between the spinning outer perimeter of the disks 108 and the inner surface of base 106. However, the radial shroud of the base 106 cannot extend into the gap 118 coextensive with the actuator arms 110 so that the HSA can be inserted into the base 106 during manufacture. When inserting the HSA, the actuator arms 110 are rotated such that they fit into the gap 118 without damaging the heads 114. The actuator arms 110 are then rotated to position the heads 114 over the disks 108. The air turbulence which forms in this gap 118 exacerbates the disk flutter, windage drag, and acoustic noise.

U.S. Pat. No. 5,898,545 to Schirle discloses a separate shroud piece which is inserted into the gap 118 and connected to the base 106 after installing the HSA. The separate shroud piece comprises air flow vanes and cams to facilitate "ramp loading" the heads 114 during spin down. Although the separate shroud piece improves the shrouding over the prior art disk drive 100 of FIG. 1, it must be precisely machined and then precisely mounted into the base 106 in both the axial and radial directions with respect to the disks 108 so as to protrude onto the disks 108 the correct distance. These precision manufacturing constraints increase the complexity and cost of the disk drive.

There is, therefore, a need to improve shrouding within a disk drive without incurring the complexity and expense of precisely machining and precisely installing additional components.

SUMMARY OF THE INVENTION

The present invention may be regarded as a disk drive with improve shrouding, comprising a disk, a spindle motor for rotating the disk, a head, an actuator arm for actuating the head radially over the disk, a base, and a cover attached to the base to form a head disk assembly chamber. The cover comprises an inner surface and an outer surface, and a shroud extending axially from the inner surface into the head disk assembly chamber substantially enveloping the periphery of the disk, including at least part of the periphery coextensive with the actuator arm, to provide radial shrouding of the disk.

In one embodiment, the cover further comprises a substantially C-shaped depression positioned substantially concentric over the disk to provide axial shrouding.

The present invention may be regarded as a method of manufacturing a disk drive with improved shrouding. A shroud is formed in a cover of a head disk assembly (HDA). A disk, a head, an actuator arm for actuating the head radially over the disk, and a motor for rotating the disk, are disposed into the HDA. The cover is attached at a base of the HDA such that the shroud substantially envelops the periphery of the disk, including at least part of the periphery coextensive with the actuator arm, to provide radial shrouding of the disk.

In one embodiment, the method of manufacturing the disk drive further comprises the step of forming a substantially C-shaped depression in the cover, the C-shaped depression positioned substantially concentric over the disk to provide axial shrouding.

DESCRIPTION OF THE PREFERRED EMBODIMENTS

Figure 2:
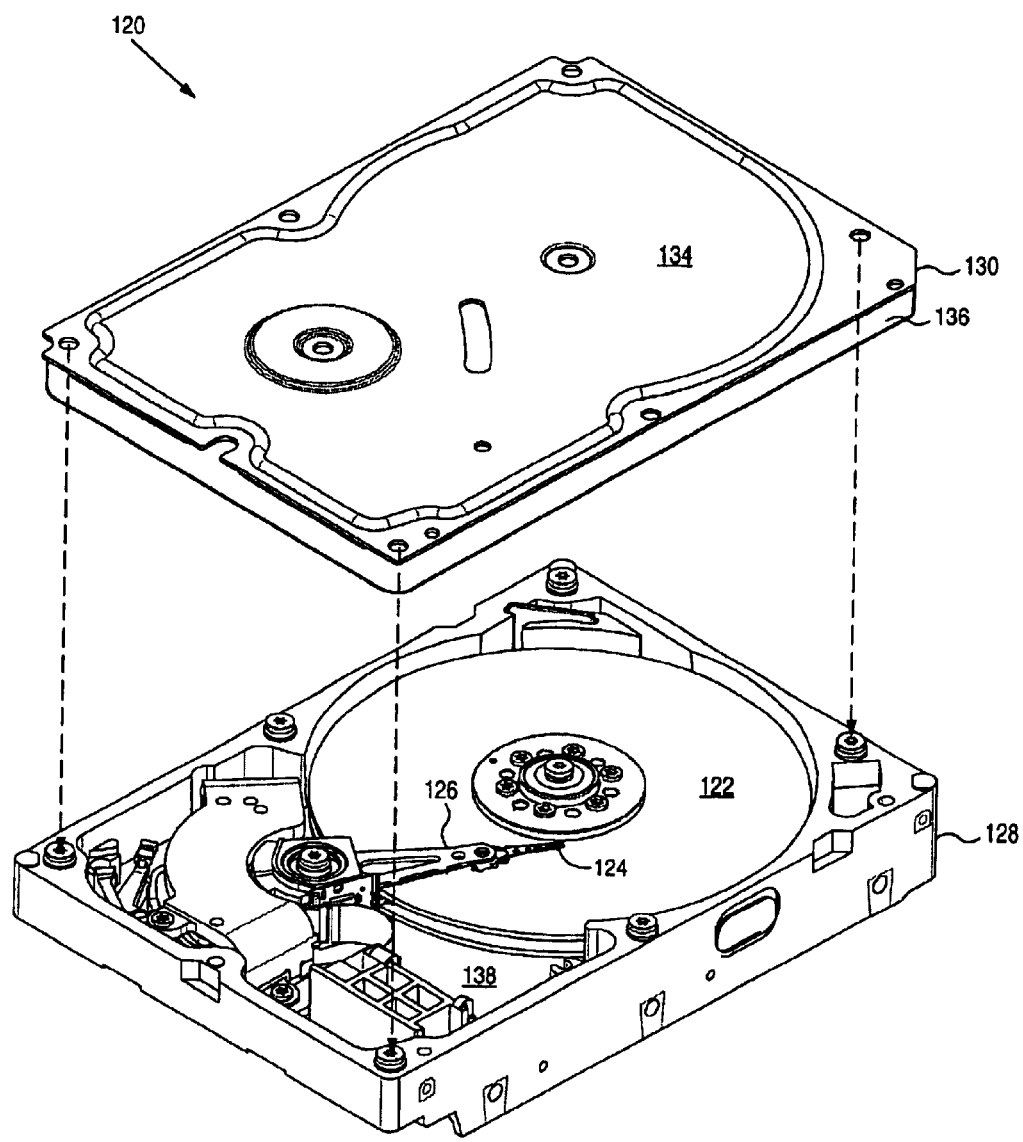
FIG. 2 shows a disk drive according to an embodiment of the present invention comprising a head disk assembly (HDA) chamber for housing a head stack assembly and a disk. An HDA cover comprises an inner surface and an outer surface, and a shroud extending axially from the inner surface into the HDA chamber substantially enveloping the periphery of the disk, including at least part of the periphery coextensive with an actuator arm, to provide radial shrouding of the disk.
Figure 3A:
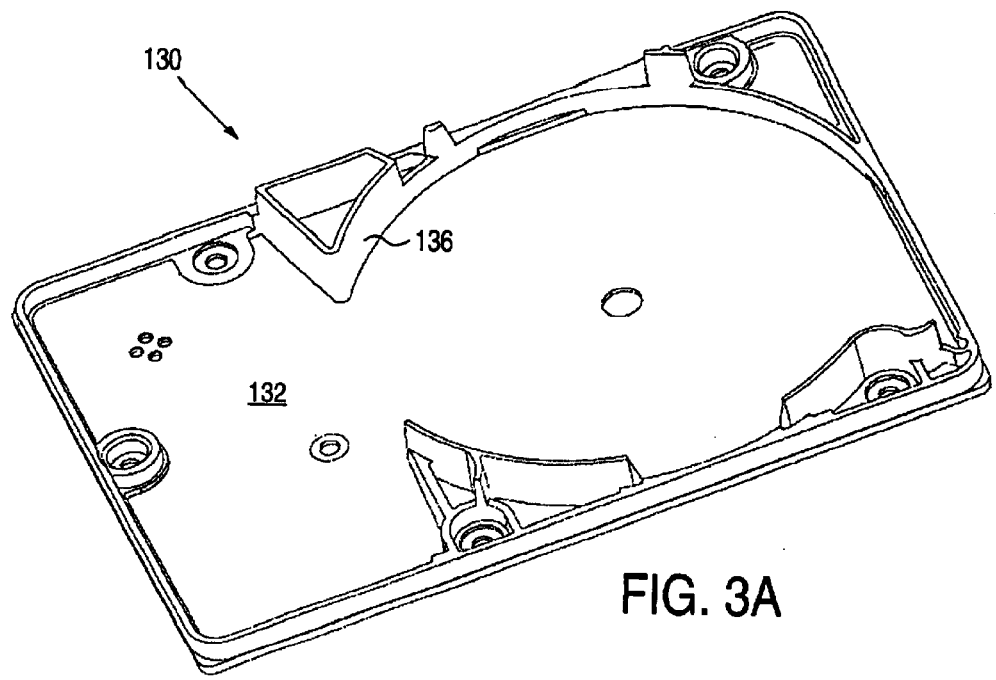
FIG. 3A shows further details of the shroud integrated with the cover of FIG. 2.

FIG. 2 shows a disk drive 120 according to an embodiment of the present invention comprising a disk 122, a spindle motor for rotating the disk 122, a head 124, an actuator arm 126 for actuating the head 124 radially over the disk 122, a base 128, and a cover 130 attached to the abase 128 to form a head disk assembly (HDA) chamber. The cover 130 comprises an inner surface 132 (see FIG. 3A) and an outer surface 134. As shown in FIG. 3A, the cover 130 further comprises a shroud 136 extending axially from the inner surface 132 into the HDA chamber substantially enveloping the periphery of the disk 122, including at least part 138 of the periphery coextensive with the actuator arm 126, to provide radial shrouding of the disk 122.

The shroud 136 may be realized using any suitable means for extending a radial shroud from the inner surface 132 of the cover 130 such that the periphery of the disk 122 is substantially enveloped (including gap 138). In one embodiment, the shroud 136 is a separate piece adhered to the inner surface 132 of the cover 130; for example, the cover may comprises a flat piece of metal and the shroud 136 an injection molded piece of plastic. Alternatively, the cover 130 may be completely form molded including to form mold the shroud 136. With injection of form molding, no additional components are installed during manufacturing to provide shrouding in the gap 138, nor is it necessary to precisely machine any such components, as with the prior art disk drive disclosed in U.S. Pat. No. 5,898,545 to Schirle.

Figure 3B:
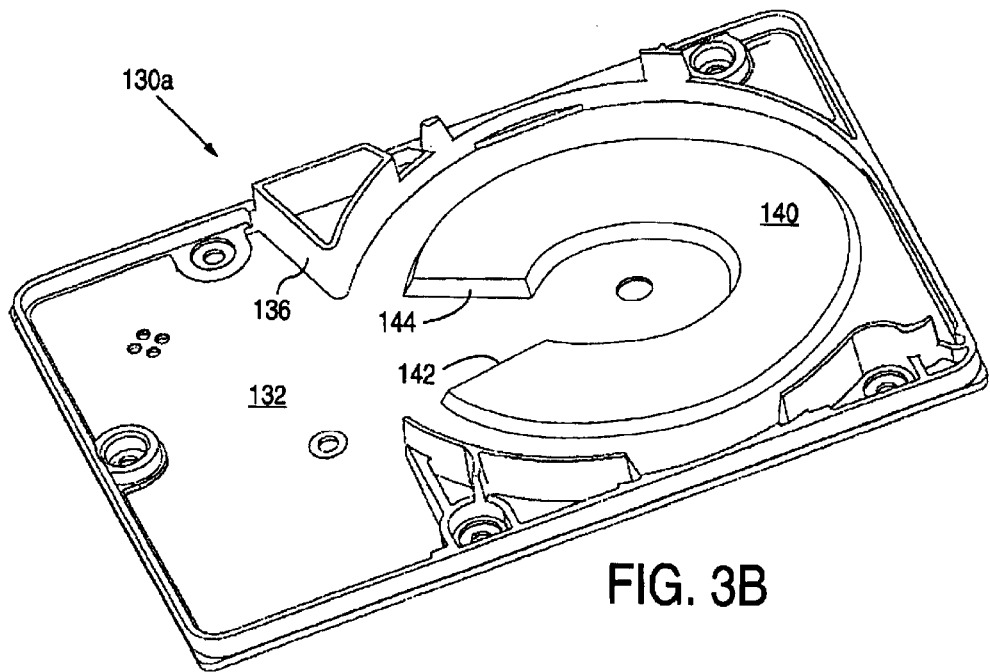
FIG. 3B shows a cover for an HDA according to an alternative embodiment of the present invention, wherein the cover comprises a substantially C-shaped depression positioned substantially concentric over the disk to provide axial shrouding of the disk.
Figure 4:
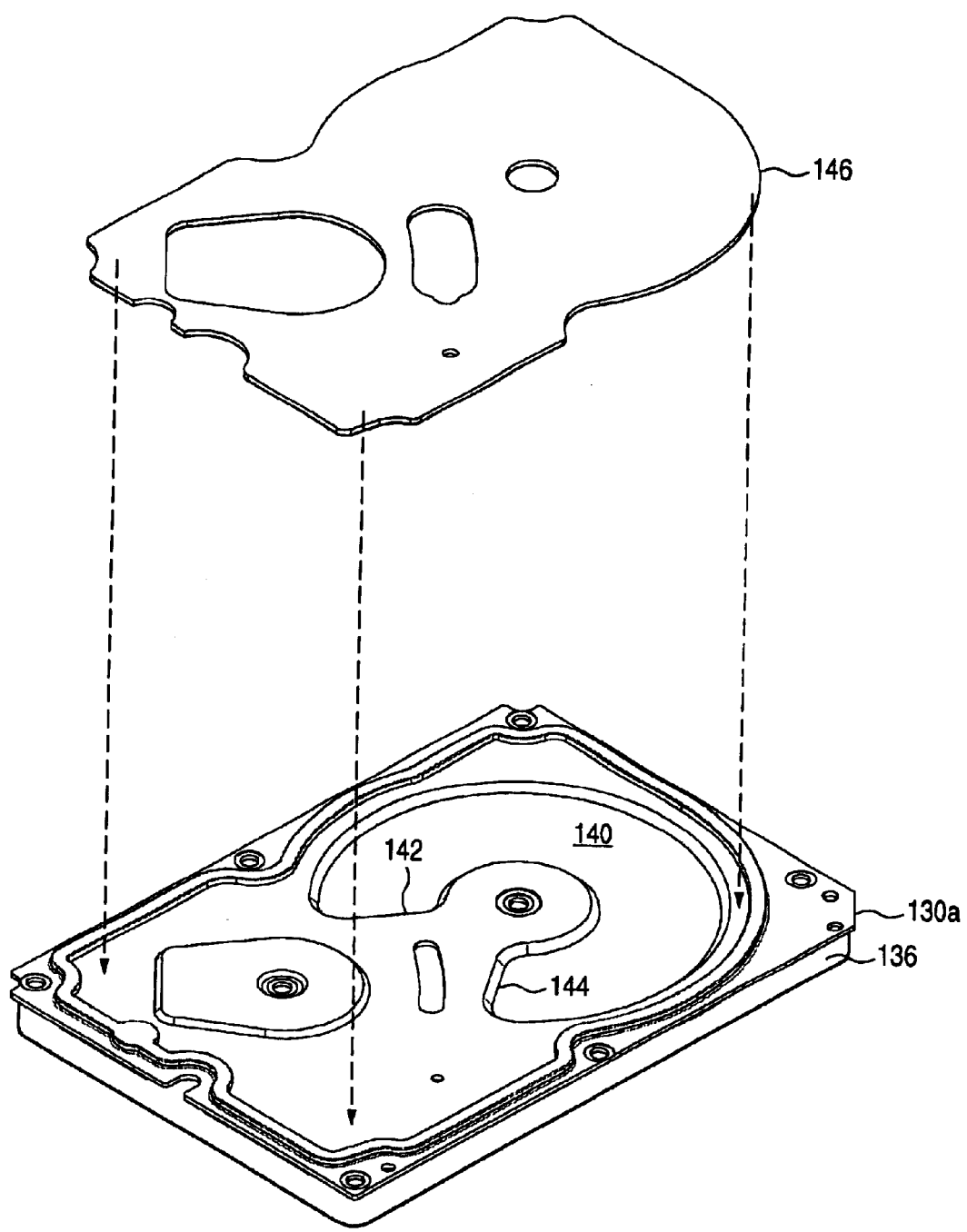
FIG. 4 shows a cover for an HDA according to an alternative embodiment of the present invention comprising an inner layer and an outer layer, wherein the inner layer comprises a substantially C-shaped depression positioned substantially concentric over the disk to provide axial shrouding of the disk.

FIG. 3B shows an alternative embodiment of a cover 130a for an HDA which, in addition to the shroud 136, further comprises a substantially C-shaped depression 140 positioned substantially concentric over the disk 122. The C-shaped depression 140 reduces the air volume in the HDA chamber relative to the surface of the disk 122 which provides axial shrouding in addition to the radial shrouding provided by shroud 136. The C-shaped depression 140 comprises depression extremities 142 and 144 that are formed in the cover 130a in such an orientation that, when the cover 130a is attached to the base 128, depression extremity 142 lies on one side of the actuator arm 126, and depression extremity 144 lies on the other side of the actuator arm 126. In this way, the depression 140 can be brought closer to disk 122, thereby displacing a larger volume of air while providing a gap to allow the actuator arm 126 to rotate and actuate the head 124 over the surface of the disk 122. As shown in FIG. 4, in one embodiment an outer layer 146 may be adhered to the cover 130a using a visco damping adhesive which attenuates acoustic noise emanating from the disk drive 120. And in yet another embodiment, a damping material (e.g., a metal having a tuned mass or compressed acoustic foam) is placed within the cavity formed by the C-shaped depression 140 and the outer layer 144 which further attenuates the acoustic noise.

A method of manufacturing a disk drive with improved shrouding according to one embodiment of the present invention comprises the step of forming a shroud 136 extending axially from an inner surface 132 of a cover 130. A head disk assembly (HDA) is disposed into a base 128 of an HDA chamber, wherein the HDA comprises a disk 122, a head 124, an actuator arm 126 for actuating the head 124 radially over disk 122, and a spindle motor for rotating the disk 122. The cover 130 is attached to the base 128 of the HDA chamber such that the shroud 136 substantially envelopes the periphery of the disk 122, including at least part 138 of the periphery coextensive with the actuator arm 126, to provide radial shrouding of the disk 122. In one embodiment in which the shroud 136 is a separate piece, the method further comprises the step of adhering the shroud 136 to the inner surface 132 of the cover 130. In another embodiment, the method further comprises the step of form molding the cover 130; wherein the form molded cover 130 comprises the shroud 136. In yet another embodiment, the method further comprises the step of forming a substantially C-shaped depression 140 in the cover 130, the C-shaped depression 140 positioned substantially concentric over the disk 122 to provide axial shrouding.

Figure 1:
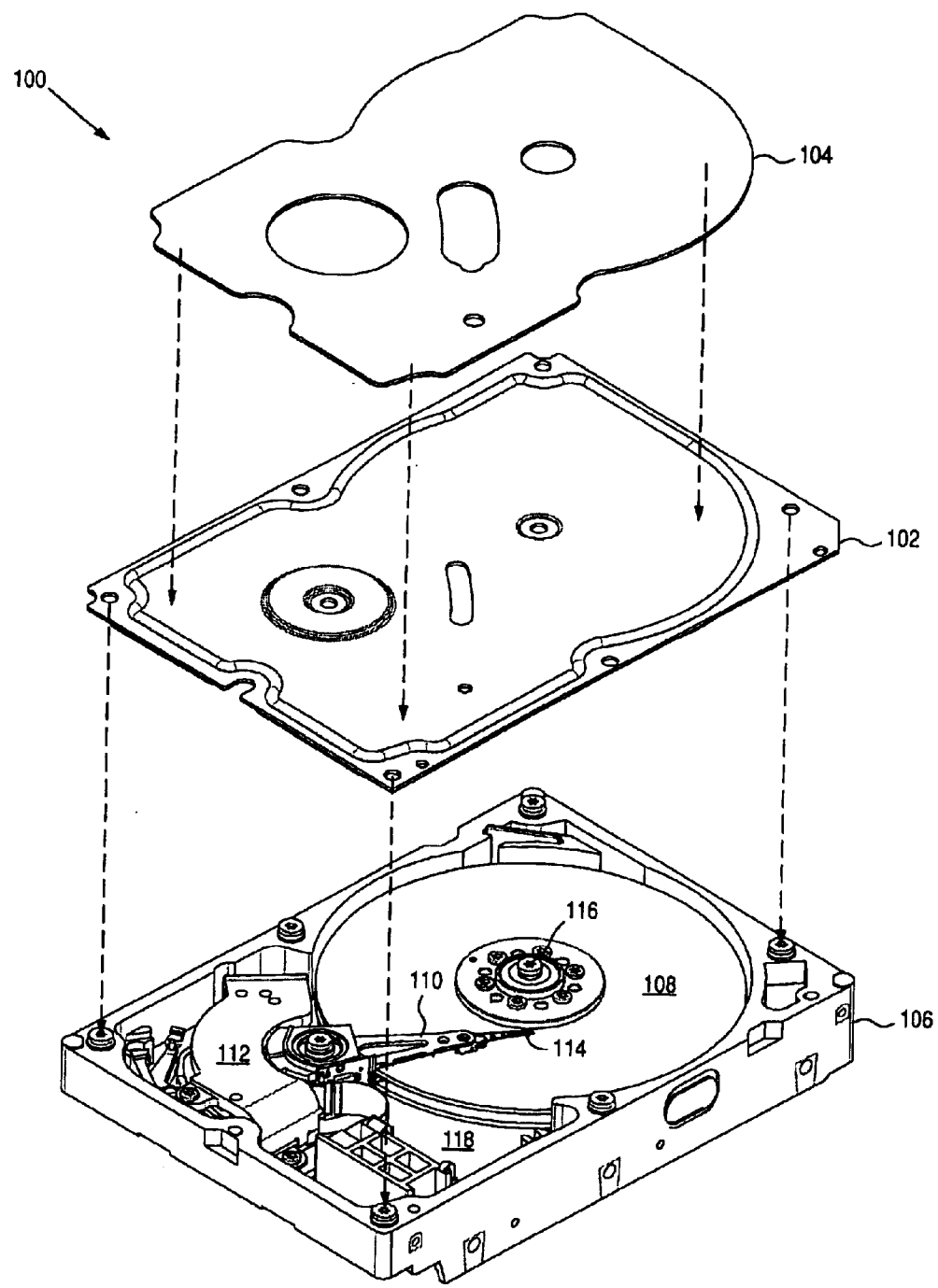
FIG. 1 shows a prior art disk drive wherein the base of a head disk assembly (HDA) is formed around the periphery of the disk to provide radial shrouding, but does not extend into a gap which facilitates installing the head stack assembly into the HDA during manufacturing.

Because the cover 130 is attached to the base 128 of the HDA chamber after placing the actuator arm 126 in gap 138 and rotating the actuator arm 126 to position the head 124 over the disk 122, the shroud 136 integrated with the cover 130 can extend into the gap 38 providing additional shrouding over the prior art disk drive of FIG. 1.

I claim:

1. A disk drive with improved shrouding, comprising:
    (a) a disk;
    (b) a spindle motor for rotating the disk;
    (c) an actuator arm;
    (d) a head coupled to a distal end of the actuator arm;
    (e) a rotary actuator for rotating the actuator arm about a pivot to actuate the head radially over the disk;
    (f) a base; and
    (g) a cover attached to the base to form a head disk assembly chamber, wherein the disk, head, actuator arm, and rotary actuator are enclosed within the head disk assembly chamber, the cover comprising:
        an inner surface and an outer surface; and
        a shroud extending axially from the inner surface into the head disk assembly chamber substantially enveloping the outer periphery of the disk, including at least part of the outer periphery coextensive with the actuator arm when the actuator arm is positioned adjacent to the outer periphery of the disk, to provide radial shrouding of the disk.

2. The disk drive as recited in claim 1, wherein the shroud is a separate piece adhered to the inner surface of the cover.

3. The disk drive as recited in claim 1, wherein the cover is form molded and the form molded cover comprises the shroud.

4. A cover for attaching to a base of a disk drive to form a head disk assembly chamber, the head disk assembly chamber comprising a disk, an actuator arm, a head coupled to a distal end of the actuator arm, and a rotary actuator for rotating the actuator arm about a pivot to actuate the head radially over the disk, the cover comprising:

(a) an inner surface and an outer surface; and
(b) a shroud extending axially from the inner surface for insertion into the head disk assembly chamber so as to substantially envelope the outer periphery of the disk, including at least part of the outer periphery coextensive with the actuator arm when the actuator arm is positioned adjacent to the outer periphery of the disk, to provide radial shrouding of the disk.

5. The cover as recited in claim 4, wherein the shroud is a separate piece adhered to the inner surface of the cover.

6. The cover as recited in claim 4, wherein the cover is form molded and the form molded cover comprises the shroud.

* * * * *